United States Patent [19]

Phillips

[11] 4,199,023
[45] Apr. 22, 1980

[54] HEAT DEMAND REGULATOR

[76] Inventor: Chester C. Phillips, 4310 Frankfort Dr., Rockville, Md. 20853

[21] Appl. No.: 848,669

[22] Filed: Nov. 4, 1977

[51] Int. Cl.² ............................................. F25B 29/00
[52] U.S. Cl. ......................................... 165/12; 165/26
[58] Field of Search ...................... 165/12, 13, 14, 26, 165/27, 30

[56] References Cited

U.S. PATENT DOCUMENTS

| | | | |
|---|---|---|---|
| 3,526,271 | 9/1970 | Jednacz et al. | 165/26 |
| 3,677,335 | 7/1972 | Weatherston | 165/12 |
| 3,709,289 | 1/1973 | Weatherston | 165/26 |
| 3,933,197 | 1/1976 | Zimmer et al. | 165/27 |
| 3,942,718 | 3/1976 | Palmieri | 165/26 |

*Primary Examiner*—Stuart N. Hecker
*Attorney, Agent, or Firm*—Harold Gell

[57] ABSTRACT

An electronic means to cyclically control the heat or air conditioning source in an environmental temperature control system so that the heat exchange surfaces are maintained within a predetermined range to maximize heat exchange efficiency and minimize total operating time of the heat or cooling source. The apparatus incorporates a temperature responsive transducer which provides a voltage level that is compared to an analog representation of a controllable, periodic output of a digital counter to produce a signal for selectively energizing the heat or cooling source of the environmental temperature control system for a time period proportional to heat demand but limited to relatively short durations of time so as to minimize or limit the temperature of the heat exchange surface during temperature modification demand periods.

13 Claims, 8 Drawing Figures

HEAT DEMAND REGULATOR

THE INVENTION

This invention relates to a system adapted to energize the heating means or cooling means in an environmental control system so that a heat exchange surface is maintained within a temperature range which provides the most efficient system operation. This is accomplished through the invention by cyclically operating the heating or cooling means for relatively short durations of time compared to the thermal time constants of the heating or cooling means.

BACKGROUND OF THE INVENTION

The fossil fuel energy crisis which is rapidly engulfing the civilized world is focusing attention on the wasteful practices of that world. One of those wasteful practices which should be eliminated resides in the method of operation of environmental conditioning systems such as heating and cooling units for residential and commercial dwellings.

The majority of environmental conditioning systems function by monitoring the temperature of a space to be heated or cooled by an automatic means which causes a heating or cooling unit to be activated when the controlled space temperature exceeds a predetermined value. For instance consider a typical residential heating unit which utilizes a fossil fuel burner in combination with a forced air system. When the temperature of the structure decreases below a predetermined minimum, the fossil fuel burner is ignited and air (or other heat transfer media) is forced over a heat exchanger in a duct system. After a brief period of time, the heat exchanger reaches a relatively high temperature and its ability to absorb heat decreases. This results in the discharge of significant quantities of surplus heat through the exhaust gas system or flue rather than being absorbed by the air or other cooling media passing on the other side of the heat exchanger. When the temperature in the controlled space exceeds a predetermined value, the fossil fuel burner is turned off. The forced air system continues to function and the residual heat in the heat exchanger is utilized to increase the heat in the control space above the turn-off value. During this portion of the cycle of operation, both sides of the heat exchanger are significantly cooler than the heat exchanger member and therefore some heat is radiated both up the flue (a second source of waste) and into the forced air system. The heat discharged through the flue is a waste of fossil fuels and is a direct function of the temperature differential between the heat exchange surfaces and the burner side of the heat exchange unit. That is, as the heat exchanger becomes hotter, it resists absorption of heat from the burner fire. This heat which is not absorbed is then discharged through the exhaust gas flue system and represents a significant loss in total system efficiency.

Prior art systems have been developed which attempt to minimize the above suggested losses. However, these attempts are relatively complex and costly, requiring an excessive amount of hardware and maintenance but offering relatively poor efficiency.

For instance, the Verden patent, U.S. Pat. No. 3,401,880 on "Compensated Temperature Control System" discloses a system which includes a temperature responsive device in a controlled space and a temperature responsive device in the heating plenum. The system functions to maintain plenum heat at predetermined levels by cycling the heating apparatus on and off at a duty cycle which is a function of the demands for heat of the control space. The system utilizes a time delay heat responsive element to control cycle durations and is not precise or adjustable. The purpose of this invention was to compensate the room thermostat so as to minimize overshoot and undershoot common to such devices and thereby maintain a more uniform dewlling temperature. It required multiple sensors and made no attempt to optimize cycle rate for efficiency.

Devices such as the Verden system place a relatively delicate switching means in an extremely hostile environment where it is subjected to a relatively large number of operational cycles, resulting in high failure rates. They moreover failed to provide proportional control by their dependence on a normal thermostatic sensor.

Another contemporary approach to an environmental temperature control system utilizing digital counters is exemplified by Weatherston in U.S. Pat. No. 3,677,335 on "Staged Heating And Cooling System". This patent teaches the concept of utilizing a digital system to control a heating and air conditioning system by sequentially stepping the temperature modifying unit through a predetermined series of steps calculated to cause a controlled space to reach a predetermined temperature. Systems such as this become increasingly inefficient as the environmental temperature outside of the controlled space varies or as heat losses from the controlled space varies due to structure usage. Theys respond slowly to changes in demand and are characterized by large temperature overshoot or undershoot during periods of changing temperature.

OBJECTIVES OF THE INVENTION

Therefore, a primary objective of the present invention is to provide a means to cyclically control the heating and cooling means of an environmental temperature control system so that the heat exchanger is operated within the most efficient temperature range.

A further objective of the present invention is to provide a fossil fuel burner controlled by a temperature responsive transducer signal modified by an adjustable digital counter.

A still further objective of the present invention is to provide a fossil fuel fired heating system control means adapted to permit relatively short periods of burning interspaced by adjustable periods of no combustion calculated to cause the heat exchange unit to be maintained within the most efficient temperature range for the specific space to be heated.

Another objective of the present invention is to provide a digital counter adapted to control a heating and air conditioning system so that the heat and cold producing means are sequenced on and off at a predetermined rate during the conditioned air demand cycle of the primary system.

A still further objective of the present invention is to provide an apparatus for cyclically controlling the heating and cooling means of an environmental control system so that the system heat exchanger is maintained within a temperature range calculated to optimize efficiency.

A still further objective of the present invention is to provide a heating and cooling system control means adapted to sequentially energize the temperature modifying means at a controllable, cyclic rate during the primary operational cycle which is relatively easy to manufacture, install and maintain and may be produced and operated at a minimal expenditure.

Another objective of the invention is to provide a digital means for lowering the dwelling controlled space temperature for periods of sleep or work and automatically increasing these temperatures to normal after a preset period.

A further objective of the invention is to provide a means of automatically synchronizing multiple units in zoned heating applications so that heat demand periods for all zones will coincide to a maximum extent.

Further objectives of the present invention will become apparent in light of the drawings and specification which follow.

SUMMARY OF THE INVENTION

The efficiency of fossil fuel furnaces is substantially improved by the disclosed control process which prevents high combustion heat exchanger wall temperatures. This results in an increase in the average temperature differential between the combustion products and the walls so that more heat can be extracted from the combustion products before they leave the furnace.

This is accomplished by controlling the burn periods of the furnace during the heat demand mode of the system so that the furnace is cyclically turned on and off. The on times are calculated to permit the heat exchanger walls to reach what is considered to be the maximum allowable temperature required to maintain adequate efficiency of the system consistent with heat requirements and the off times of the furnace are adjusted to permit the optimum amount of heat to be extracted from the surfaces before the next subcycle of furnace firing commences.

A timed reduction in temperature for sleep or work periods is provided by a digital counter and digital flipflop which causes a bias voltage to be generated which suppresses the temperature a controllable amount (such as 10°) for a controllable time (i.e. $\simeq 7$ hours).

The invention is further adapted to multi-zone heating to produce the same cyclic control of burning from multiple locations by resetting the counters by R-C coupling to the power supply so that any interruption of electric power common to all temperature regulators will cause all digital counters to start at the same value. They will forever run in synchronism by result of this count value being entirely determined by the AC line frequency.

The preceding is accomplished in the present invention by providing a clock generator which controls a digital counter adapted to provide output pulses which are converted to an analog signal that is compared to the output of an electronic temperature sensor. The output of the comparator controls the operation of the fossil fuel burner or air conditioning system.

DESCRIPTION OF THE DRAWINGS

FIG. 5 is a schematic diagram representing an analog embodiment of the present invention.

FIG. 6 A, B and C is a schematic diagram representing a digital embodiment of the present invention.

DESCRIPTION OF THE INVENTION

It is well known that the efficiency of fossil fuel furnaces can be vastly improved by a control system which reduces the average combustion heat exchanger wall temperature so that more heat can be extracted from the combustion products before leaving the furnace. One means to accomplish this is to cause the furnace to burn in cycles which allow the furnace walls to heat up and cool off but limit the heat up or on cycle to a time which is not long in relation to the thermal time constant of the heat exchanger. This reduces the temperature of the combustion products leaving the furnace by maintaining a lower temperature on the interior surface of the heat exchanger.

Typical home furnaces have time constants of about two minutes. That is, the combustion exhaust products reach approximately 62% of the final output temperature in a two minuted period. During this period, the exhaust gas temperatures exponentially approaches 500 to 600 degrees Fahrenheit. However, heat extraction on the cold side of the furnace heat exchanger is delayed by about one minute due to the thermal lag exhibited by the heat travelling through the heat exchanger walls to the output surface. Nearly all heat absorbed by the heat exchanger is available as useful heat on the output side, but heat not absorbed on the input side of the heat exchanger is lost through the flue.

A higher percentage of the combustion heat is transferred to the heat exchanger when the walls are relatively cool and this concept is incorporated into the present invention by cycling the furnace on for a short period of time relative to the total heat requirement and holding the burner off for periods long enough to allow the interior heat exchanger walls to cool down for the next burning cycle. Observations of the output temperature of typical home furnaces indicate that this cooling process occurs in a period of about one minute.

Thus the typical perimeters identified indicate that the furnace, for optimum and the most efficient operation, should be on for less than two minutes in any cycle and off for greater than one minute. However, the sensitivity of these perimeters is not high.

In a preferred embodiment, the present invention automatically controls a typical home furnace via electronic circuitry which functions as a cycling heat demand regulator. This regulator holds the burner on for a length of time proportional to the difference between the temperature of the dwelling and the set temperature or desired temperature and turns the burner off for the remainder of a fixed total time interval. The total time interval employed in the preferred embodiment is approximately four minutes. However much shorter or longer periods could be used but it must be remembered that the optimum is relatively short. Extremely short periods cause an excessive number of start/stop operations of the fuel control equipment and this could contribute to equipment failures. Therefore the design of the preferred embodiment is optimized by selecting a cycling period which is as short as possible but yet will not excessively abuse the fuel control equipment.

The table below illustrates typical burn time and off times for 4.55 minute cycle.

| HEAT DEMAND | ON | OFF |
|---|---|---|
| ~12.5% | 34 seconds | 239 seconds |
| ~25% | 68 seconds | 205 seconds |
| ~37.5% | 102 seconds | 171 seconds |
| ~50% | 137 seconds | 136 seconds |
| ~62.5% | 171 seconds | 102 seconds |
| ~75% | 205 seconds | 68 seconds |
| ~87.5% | 239 seconds | 34 seconds |
| 100% | 273 seconds | 0 seconds |

Figure 1:
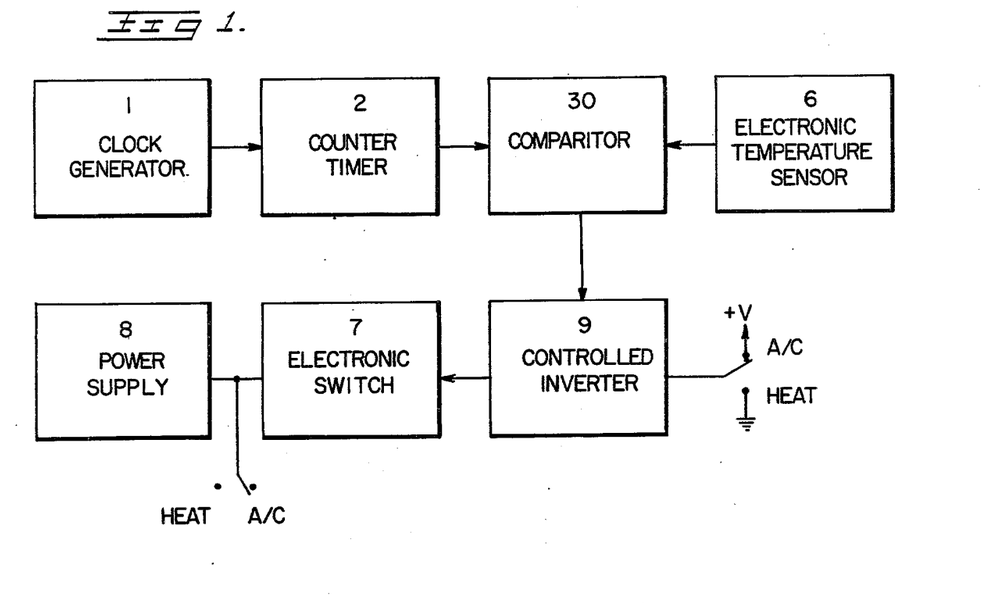
FIG. 1 is a block diagram of the basic invention.

The preceding functions are provided by the present invention illustrated in FIG. 1 wherein a clock generator 1 supplies a pulse train to a combined counter and timer 2 which provides output pulses representing the optimum on time. These pulses are applied to a comparator 30 which contrasts their value to the output of electronic temperature sensor 6. The output of the comparator 30 is applied to a control inverter 9 which operates an electronic switch 7. The electronic switch provides a control signal through the single pole double throw A/C-heat switch. This switch channels the control signal from the electronic switch 7 to either the furnace activation system or the air conditioning activation system.

Power supply 8 is provided to supply precisely regulated potentials for the circuitry of the control system.

Figure 2:
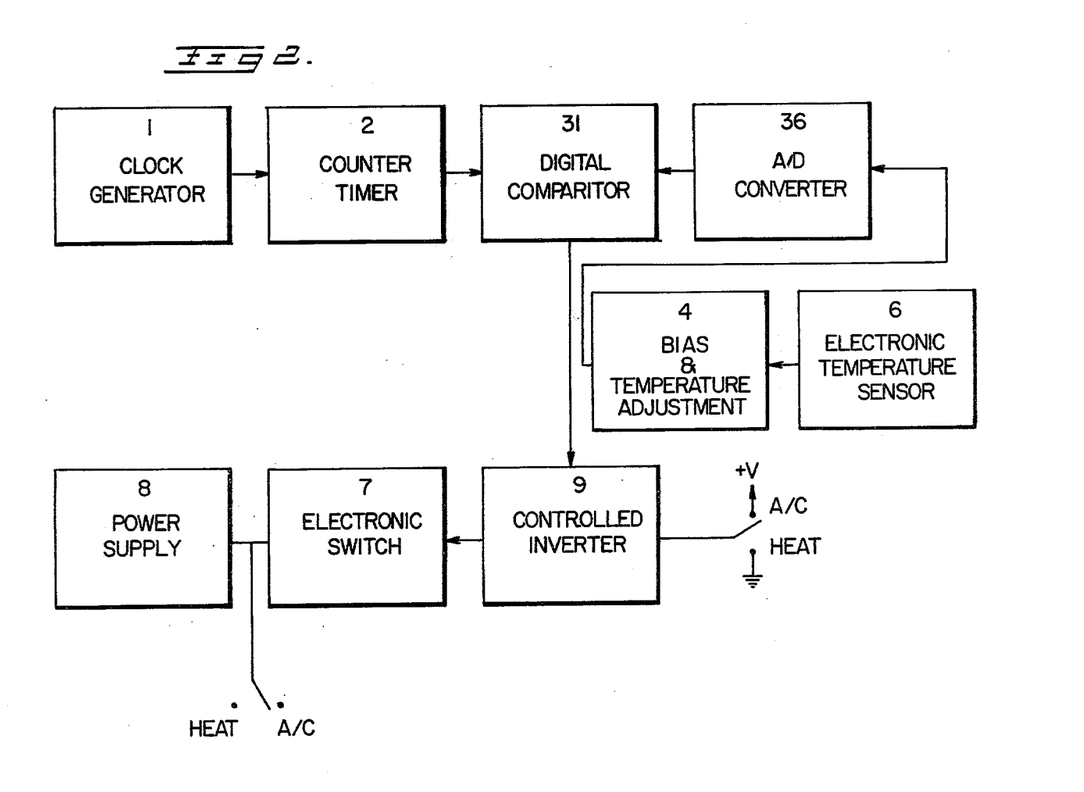
FIG. 2 is a block diagram depicting a digital embodiment of the present invention.

FIG. 2 illustrates a digital embodiment of the present invention for providing the preceding control functions. In this embodiment a clock generator 1 supplies a pulse train to a combined counter and timer 2 which provides output pulses representing optimum on time. These pulses are applied to digital comparator 31 which is also responsive to a pulse train produced by analog-to-digital converter 36. The pulse train generated by analog-to-digital converter 36 is a function of the output of electronic temperature sensor 6 in combination with a bias and temperature adjustment means 4. Functionally, electronic temperature sensor 6 produces an analog voltage which is altered by the bias and temperature adjustment network 4 to create a signal level which is then converted to a digital pulse train by analog-to-digital converter 36. The output of the digital comparator 31 is a signal adapted to provide proper regulation of controlled inverter 9. The controlled inverter operates an electronic switch 7 which provides a control signal through the single pole double throw AC-heat switch. This switch channels the control signal from the electronic switch 7 to either the furnace activation system or the air conditioning activation system.

Power supply 8 is provided to ensure properly regulated DC potentials for the various circuits of the control system.

Figure 3:
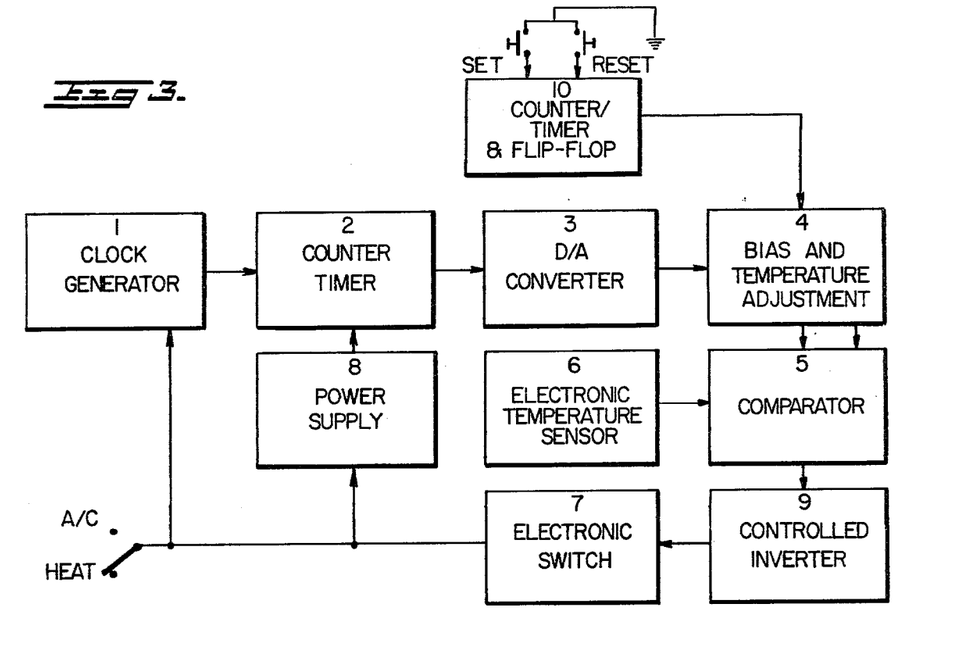
FIG. 3 is a block diagram depicting an analog embodiment of the present invention.

The preceding functions are provided by an analog embodiment of the present invention illustrated in FIG. 3 wherein a clock generator 1 supplies a pulse train to a combined counter and timer 2 which provides output pulses representing the optimum on time. These pulses are applied to the digital-to-analog converter 3 which produces an analog signal that is applied to a bias and temperature adjustment network 4. The bias and temperature adjustment provides two attenuated analog signals representing the input to that circuit and they are combined in the comparator 5. This combined signal is compared to an analog signal generated by the electronic temperature sensor 6. The output of the comparator is applied to a controlled inverter 9 which operates an electronic switch 7. The electronic switch provides a control signal through the single pole double throw A/C-heat switch. This switch channels the controls signal from the electronic switch 7 to either the furnace activation system or the air conditioning activation system.

Timed reductions or increases in temperature are provided by the embodiment illustrated in FIG. 3 by the counter/timer and flipflop 10 which provides a bias shift as a function of set and reset switches and a relatively long duration counter.

The embodiment illustrated in FIG. 3 includes a power supply 8 which provides precisely regulated potentials to the various circuits to ensure proper operation.

Figure 4:
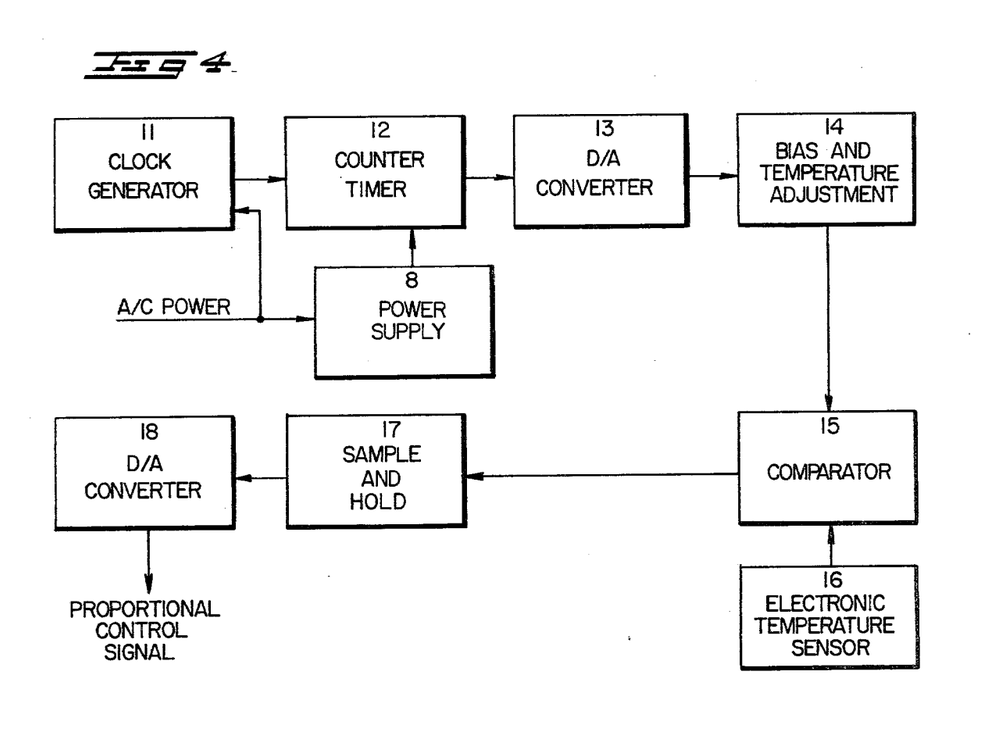
FIG. 4 is a block diagram of an alternate analog embodiment of the present invention.

An alternate embodiment of the invention is illustrated in FIG. 4 wherein the clock generator 11 applies a series of pulses to the counter/timer 12 which produces pulses of predetermined duration that are applied to the digital-to-analog converter 13. The digital-to-analog converter produces an analog output that is applied to the bias and temperature adjustment means 14 in a manner identical to that suggested for FIG. 1 above.

The bias and temperature attenuated analog output of the digital-to-analog converter is compared in comparator 15 with the output of an electronic temperature sensor 16 in a manner similar to that utilized in the preferred embodiment illustrated in FIG. 3. The output of comparator 15 is essentially identical to the output of comparator 15 of the preferred embodiment.

The embodiment illustrated in FIG. 4 differs from the embodiment presented by FIG. 3 in that the output of comparator 15 is applied to a sample and hold circuit 17. The sample and hold circuit converts the analog signal to a pulsed signal which is then applied to digital-to-analog converter 18. The output of digital-to-analog converter 18 is an analog signal having a level proportional to the heat demand requirements. The signal may be scaled or amplified as required to provide the precise signal requirements for control systems requiring precise amplitude control.

The basic operation of the embodiments illustrated in FIGS. 3 and 4 are similar. As the counter, 2 or 12, cycles, the input to the comparator, 5 or 15, is cyclically raised and lowered over a small region in steps. When the input voltage to the comparator from the bias and temperature adjustment reaches a value greater then that of the electronic temperature sensor input, the comparator will produce an output pulse.

In FIG. 3 the output pulse produced by the comparator will change the state of the electronic furnace control switch 7 via the controlled inverter 9. The state of the switch remains changed until the counter/timer 2 is reset to the beginning of its cycle. As the sensed temerature rises, the amount of on-time of the furnace during the cycle is reduced. As the temperature falls, the amount of on-time of the furnace during the cycle is increased. This ratio is reversed when the system is functioning in the air conditioning mode.

In the embodiment illustrated in FIG. 4 the output pulses of the comparator 15 are applied to the sample and hold circuit 17 which is an analog-to-digital converter adapted to produce a pulse train now representative of the comparator input. This pulse train is applied to the digital-to-analog converter 18 and the resultant analog signal is then used to proportionally control in an environmental control system.

Figure 6A:
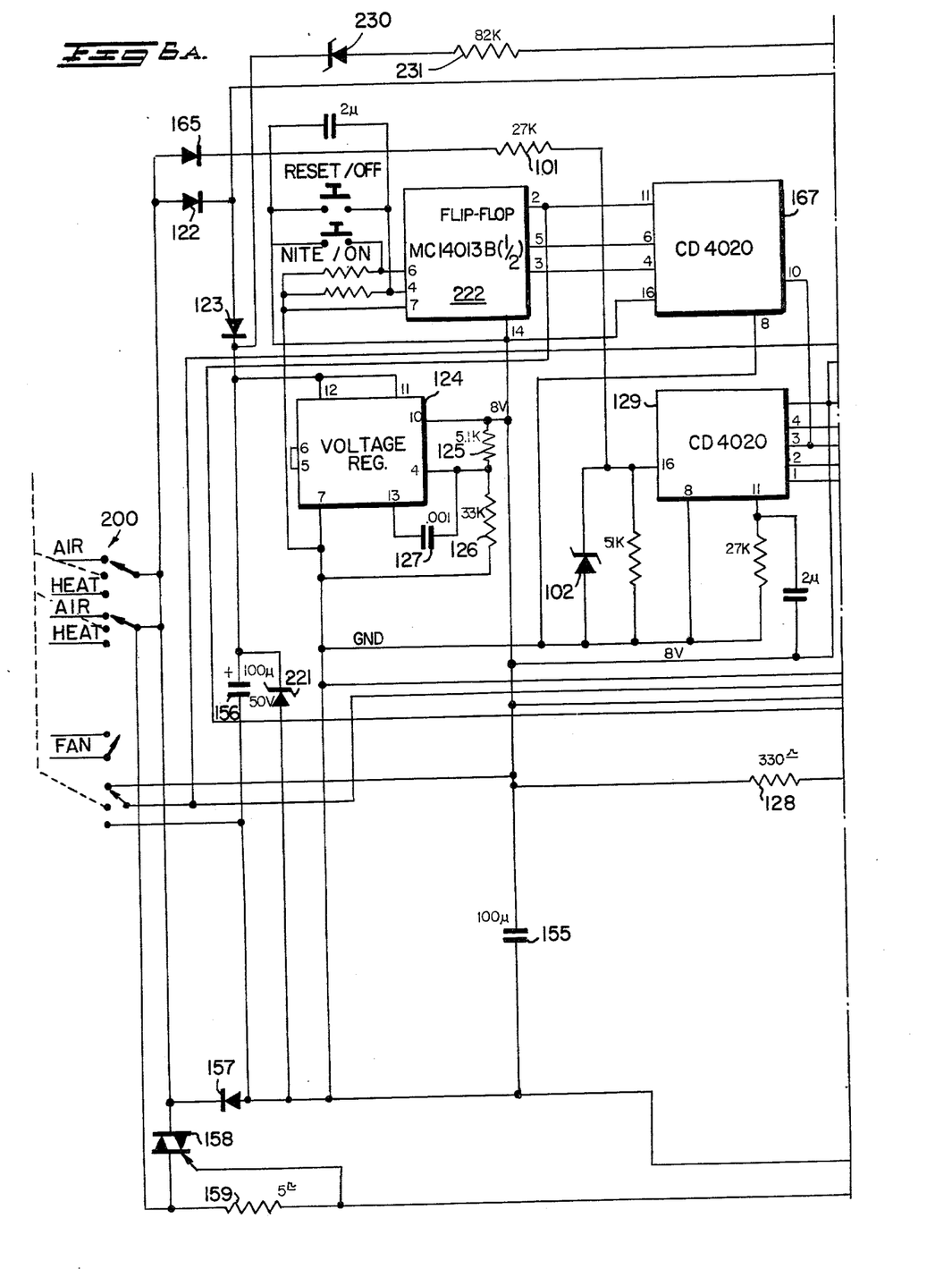
Figure 6C:
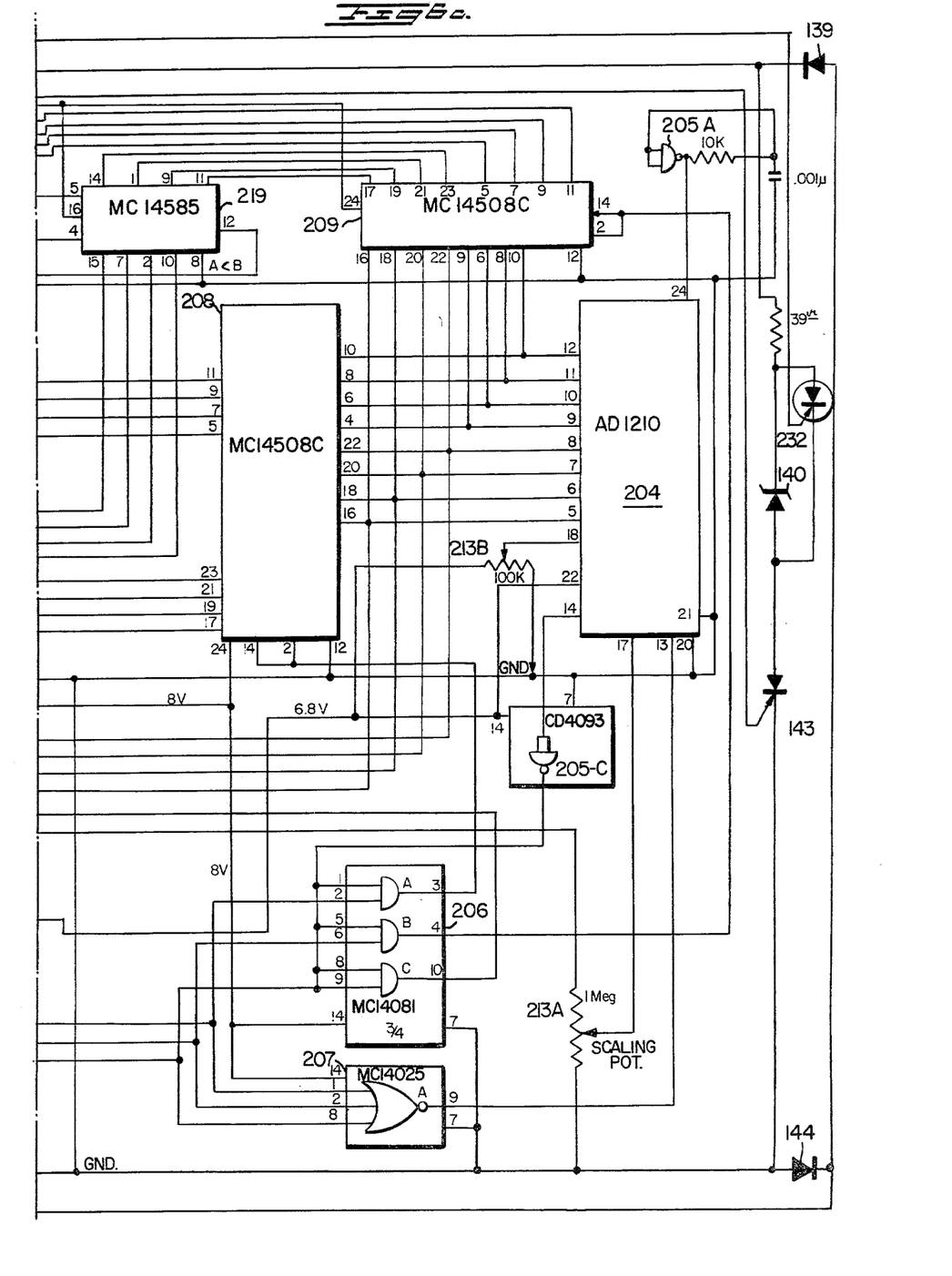

FIG. 6 A, B and C illustrates a digital embodiment of the present invention. In this system, a 60 cycle input is provided through the gang function switch 200 to cycle counter 129 via diode 165 through resistor 101. This input to cycle counter 129 is regulated by zener diode 102 to ensure that the counter is not overdriven. The cycle counter 129 provides a basic cycle time of about 4.5 minutes and produces outputs at pins 1, 2, 3 and 4 which are $II^{12}$, $II^{13}$, $II^{14}$, and $II^{11}$ bits respectively. These outputs are employed for deriving timing functions.

When the counter 129 outputs a 0000, it is decoded by the four input NOR gate 201A which turns on the bilateral switch 202A which connects the set temperature control voltage (generated by the potentiometers and resistors within block 203) to the analog/digital converter input on pin 17 of the analog-to-digital converter 204.

The analog-to-digital converter 204 commences a conversion in response with start conversion signal applied to pin 13. This signal is generated by the action of NOR gate 201A decoding the timing outputs from cycle counter 129 and applying the decoded output through NOR gate 207A.

A NOT end of conversion ($\overline{EOC}$) signal from the analog-to-digital converter 204 is inverted by NAND gate 205C and then ANDed with the output of NOR gate 201A by AND gate 206A. The output of AND gate 206A is applied to the 8-bit latch 208 which stores the converted measured temperature level.

When the cycle counter 129 reaches a value of 0001 (the next step) its output is decoded in NOR gate 201B. This four input NOR gate applies a signal to bilateral switch 202C which couples the output of temperature sensor 147 to the analog-to-digital converter 204.

NOR gate 201B initiates a new conversion by outputting a start conversion signal through NOR gate 207A to pin 13 of the analog-to-digital converter 204.

The NOT end-of-conversion signal is inverted by NAND gate 205C and the end-of-conversion signal is ANDed with the decoded time signal 0001 from NOR gate 201B in AND 206B.

The signal from AND gate 206B is used to store the converted measured temperature in the 8-bit latch 209.

When the counter 129 advances to XX1X, a similar process is started by turning on switch 202B which connects the off set temperature control potentiometer 210 voltage to the analog-to-digital converter 204. The XX1X signal also starts the analog-to-digital conversion by an input to NOR gate 207A.

The EOC signal from NAND gate 205C is ANDed with the XX1X signal in AND gate 206C and the output is used to store the converted signal level in a 4-bit register 211. The limited range of the temperature off set potentiometer caused by the series dropping resistor 212 allows the 4-bit register 211 to store the converted results.

A scaling potentiometer 213 is provided in the analog input to the analog-to-digital converter 204 to allow the input voltages to be scaled so that the lowest bit used in the analog-to-digital converter can be scaled to 0.5° Fahrenheit (actually the $2^4$ bit since the analog-to-digital converter is a 12-bit converter in a preferred embodiment). Potentiometer 213B is employed to off set the analog-to-digital converter so that the binary number in the analog-to-digital converter will read indirect degrees above 0° Fahrenheit.

The contents of 4-bit register 211 represents a temperature off set to be added or substracted from the temperature for some number of hours determined by the timer setting. This is effected in the QUAD exclusive-OR gates of 214. In the A/C mode, the output of register 211 is inverted by signals on pins 2, 6, 9 and 13 which are control signals from the heat/air conditioning switch. The same signals are used for the carry-in signal on pin 9 of the 4-bit adder 215 and the B inputs (pins 6, 4, 2 and 15) of adder 244. This has the effect of inverting the input to 215 and 224 and adds 1 which is the requirement for binary substraction in an adder.

The temperature off set output of 214 is added or substracted to the output of counter 129 in adder 215. A control signal, explained later, is used to add a bias in the most significant bit of adder 215 when the unit is operating an air conditioner or heat pump and the controlled air conditioner or heat pump is turned off by the electronic switch. This is to prevent too rapid cycling of the air conditioner or heat pump compressors. An internal select switch 216 is used to select the type of operation.

The output of adder 215 is added to the set temperature stored in the 8-bit latch 208 in the two 4-bit adders 216 and 217 which are connected for 8-bit addition. The output of adders 216 and 217 is the sum of the set temperature and off set temperature plus the counter 129 output. All units are scaled by resistor 213 to equal 0.5° Fahrenheit for the least significant bit. The output of adders 216 and 217 is compared in comparators 218 and 219 with the measured temperature. If the measured temperature in the 8-bit latch 209 is less than the output of adders 217 and 216, the A<B output will go high on pin 12 of comparator 219 which is used to control both heat and air conditioning. In the air conditioning mode, the A<B output will be inverted by the exclusive OR gate in 220A. This allows the heat to turn on if the temperature is low and allows air conditioning to turn on if the temperature is high.

AND gate 206D is used to insert the temperature off set hysteresis into adder 215 via pin 1 whenever air conditioning is employed and the air conditioning is cut off or if a heat pump is used and the heat is off. The output of the AND gate indicates that the controlled unit is off and that an air conditioner or heat pump is being controlled. The output biases the controller to prevent fast recycling by inputting to pin 1 of adder 215. The exclusive OR gate 220B is used as an inverter on the control line for SCR 143.

The input from pin 3 of 220 to the control electrode of SCR 143 turns the SCR on so that a voltage above the 140 zener diode voltage level will cause the triac switch 158 to turn on.

The ganged function switch 201 provides approximately 26 volts through a step down transformer which is not illustrated and a heating or air conditioning control solenoid and triac 158. Referring to triac 58, solenoid 62 and step down transformer 61 of FIG. 6 may help to clarify this particular circuit in that the ultimate control functions of FIGS. 5 and 6 are similar.

The low voltage AC at the pole of switch 200 is applied to a rectifier bridge network comprised of diodes 122, 157, 139, and 144. These diodes create a full wave rectifier having a common or ground return through resistor 159 and the solenoid coil associated with triac 158 but not illustrated. The current drawn by the circuitry supplied by the full wave bridge rectifier is relatively insignificant with respect to the requirements of the load or solenoid coil 62 of FIG. 6 and therefore the load will remain unenergized.

The DC potential present at the common electrical junction of diodes 122 and 139 is applied by diode 123 and zener diode 140. Zener diode 140 is incorporated in a series circuit completed through ground via SCR 143 which is normally off but gated on via 220 as explained previously.

Diode 123 provides approximately 26 volts DC to voltage regulator 124 which is a standard 723 integrated voltage regulator chip. The unregulated 26 volts is also applied to capacitor 156 which assumes a charge and then functions as a buffer by supplying an unregulated 26 volts to the input of voltage regulator 124 during brief periods when the unregulated voltage is not supplied via diode 123 and thus provides a filtering function.

The voltage regulator 124 produced a regulated 6.8 volts by the addition to the integrated circuit of the voltage divider network comprised of resistors 125 and 126 in combination with capacitor 127. The regulated output at pin 10 of voltage regulator 124 is attenuated by resistor 128 to produce a 6.8 volt B+ potential utilized by the control system. The control system includes temperature adjustment potentiometer 154, range adjustment potentiometer 152, off set temperature control potentiometer 210 and temperature sensor 147.

Day/night timing control is provided by counter 167 which counts outputs from control counter 129. Selected outputs (for the case shown, the Q-7 and Q-6 outputs on pins 4 and 6) are used to set and reset flipflop 222. The Q-7 output of counter 167 provides a data input to flipflop 222 while the Q-6 output of counter 167 provides a clock signal. When both signals become one, the flipflop not $\bar{Q}$ output on pin 2 goes to a one state which clears counter 167 and storage register 211 containing the stored temperature off sets. The timing system on the day/night timer will remain in this state until the "night-on" switch is closed momentarily which raises pin 6 on flipflop 222 to a 1 which forces pin 2 to a 0 which then allows counter 167 to count in the off set temperature register 211 to store data for temperature off set. So long as a 1 is applied to pin 15 of register 211, the subsequent elements using 211 data will read 0 temperature off set. The reset/off switch is a method of terminating the time-temperature off set prior to completing a timing cycle.

The circuit which connects the 12 volt zener diode 230 to the input filter capacitor 156 via the 82 kilohm resistor 231 to the gate of SCR 232 which bypasses the 6.2 volt zener diode 140 in the firing circuit for triac 158 is used to increase the pull-in voltage on the external controlled relay (the solenoid load for the furnace or air conditioning relay). The circuit only works on initial turn-on while the input filter capacitor is decaying. At other times, the blocking affect of main SCR 143 when the SCR is gated off or the 12 volt zener diode 230 when the filter capacitor has decayed to 12 volts or below, prevented from functioning. However, during the decay time after turn-on, zener diode 140 in the SCR 143 circuit is bypassed such that the 60 cycle line voltage (rectified) does not have to exceed the zener voltage in order to conduct. As the result, the voltage applied to the external load is increased during this period of time which is in the order of seconds for the circuits employed. This causes the external load to securely latch up in the case of a relay at voltages which would otherwise simply cause chatter. The holding voltage on virtually all relays is significantly below the pull-in voltage and a secure latching with a higher voltage is normally desired.

The schematic diagram illustrated in FIG. 5 is an analog embodiment of the present invention. It depicts a step down transformer, 61, and burner control solenoid, 62 utilized by the environmental control system for heating functions. A similar step down transformer and control solenoid is incorporated in the air conditioning circuit but not illustrated in FIG. 5 for simplicity.

When the analog embodiment of the invention is in the heating mode as indicated in FIG. 5 with the mode selector switch 21 in the heat position, 115 volts is applied through transformer 61 and results in approximately 26 volts at switch 21. A burner control solenoid 62 is connected in series with the secondary of transformer 61 to form a circuit through triac 58 to the mode function switch 21. However, in the quiescent state triac 58 is not conducting and the solenoid remains unenergized.

The low voltage AC at the pole of switch 21 is applied to a rectifier bridge network comprised of diodes 22, 57, 39, and 44. These diodes create a full wave rectifier having a common or ground return through resistor 59 and solenoid coil 62. The current drawn by the circuitry supplied by the full wave bridge rectifier is relatively insignificant with respect to the requirements of solenoid coil 62 and therefore the solenoid remains unenergized.

The DC potential present at the common electrical junction of diodes 22 and 39 is applied to diode 23 and zener diode 40. Zener diode 40 is incorporated in a series circuit completed through ground via SCR 43 which is normally off.

Diode 23 provides approximately 26 volts DC to voltage regulator 24 which is a standard 723 integrated voltage regulator chip. The unregulated 26 volts is also applied to capacitor 56 which assumes a charge and then functions as a buffer by supplying an unregulated 26 volts to the input of voltage regulator 24 during brief periods when the unregulated voltage is not supplied via diode 23 and thus provides a filtering function.

Voltage regulator 24 produces a regulated 6.8 volts by the addition to the integrated circuit of the voltage divider network comprised of resistors 25 and 26 in combination with capacitor 27. The regulated output at pin 10 of voltage regulator 24 is attenuated by resistor 28 to result in a 6.8 volt B+ potential utilized by the control system.

Primary counter 29 is driven by a clock pulse generator comprised of a resistor-diode network consisting of resistors 63 and 64, diode 65 and zener 66. The pulse train produced by this clock pulse generator is applied to input pin 10 of the counter which is configured so that its registers will recycle constantly. This creates a periodic output at pins 1, 2 and 3 of counter 29 which represent a digital timing signal. These three digital signals or voltage levels are applied to a resistive ladder comprised of resistors 32, 33 and 34 which function as a digital-to-analog converter which applies a stepped analog voltage through resistor 50 to the input of temperature sensor 47. Temperature sensor 47 includes a temperature responsive transducer and a comparator responsive to the temperature sensitive transducer and the voltage input at pin 3. The potentials utilized are relatively low and a 10 millivolt change at pin 3 of temperature sensor 47 is equivalent to a one degree temperature shift.

The 6.8 volts DC, which is buffered by capacitor 55, is applied through a range adjustment potentiometer 52 to input pin 3 of temperature sensor 47. The voltage tapped off of the potentiometer and summed at pin 3 functions to modify the analog output of counter 29 so that the voltage level at pin 3 is approximately equal to the voltage level produced by the temperature transducer for a selected frequency range. The 6.8 volts DC is also applied to the summing input pin 3 of temperature sensor 47 via the temperature adjustment potentiometer 54. This potentiometer provides a fine tuning adjustment by altering the potential slightly at pin 3 so that it will equal the voltage of the temperature responsive transducer at a precise temperature. This potential occurs at predetermined intervals as a function of the output of counter 29 via the digital-to-analog converter comprised of resistors 32, 33 and 34.

When the comparator within the temperature sensor 47 senses that the temperature as detected by the temperature responsive transducer is below a predetermined value, an output is provided at pin 2 of temperature sensor 47. This output from the temperature sensor comparator circuitry is applied to NAND gate 37 of integrated circuit 35. This output potential is boosted by the 6.8 volts DC applied through resistor 49 and smoothed by the operation of capacitor 51. The output of NAND gate 37 is applied to the air conditioning contact of selector switch 46 and as a feedback potential via resistor 60 to the output of the digital-to-analog converter. The output of NAND gate 37 is also applied to the input of NAND gate 38 which functions as an inverter and applies the potential to the heating contact of switch 46. The pole of switch 46 is connected through feedback resistor 48 to the output of the digital-to-analog converter and also to the gate of SCR 43 via resistor 45.

When an ON command is generated by the control circuitry as a function of the analog output of the counter via the digital-to-analog converter and the temperature responsive transducer, SCR 43 is gated on. This causes zener diode 40 to conduct and complete the series circuit which includes the parallel circuit comprised of light emitting diode 42 and resistor 41. The light emitting diode is utilized to control an accessory.

When SCR 43 conducts, it causes an increase in current flow through resistor 59 in the return path for the bridge rectifier. This increase in current flow through resistor 59 causes an increase in potential at the gate of triac 58 and the triac begins to conduct. When the triac conducts it functions as a short circuit and completes a path for current for solenoid coil 62 which is sufficient to cause the solenoid to energize and turn on the furnace fuel supply. Triac 58 will remain on only so long as SCR 43 continues to conduct. Therefore, as soon as the analog potential indicating a true function at outputs 1, 2 and 3 of counter 29 is lost due to advancement within the counter, SCR 43 ceases to conduct and the enabling, gating potential at the triac is lost.

The circuit functions in a similar manner in the air conditioning except the SCR 43 is gated on during those periods when it would have been off in the heating mode due to the use of the inverter configured NAND gates 37 and 38.

Timed reduction of temperature for sleeping or work is accomplished by using the final stage in counter 67 to count longer periods of time whenever the set switch 70 is momentarily energized, the set switches set the flip-flop consisting of NAND gates 68 and 69 of integrated circuit 71 and allows counter 29 to count. Whenever counter 67 reaches any combination of count cycles denoted in the example as stage 8 and 6, the flipflop is reset. The flipflop may also be reset by the reset switch 77. While counter 67 is counting, an increase in bias voltage on the bias network is effected thru resistor 73 which reduces the temperature proportional to the amount of offset voltage induced in the bias network. At the end of the decoded time obtained in the preferred embodiment thru resistive "anding" at the flipflop thru resistors 71 and 72, the temperature will return to normal unless it is done earlier by resetting with the switch.

The RC networks 73, 74 and 75, 76 of FIG. 3 attached to the reset pins 11 of counters 29 and 67 respectively ensure that several devices driven by the common AC voltage source will always run in synchronization and that the desired effect of having the fuel supply on for only limited parts of the cycle will be realized. All such devices, by virtue of the RC network, will demand fuel at the same time to such extent as fuel is needed.

Although preferred embodiments of this invention have been illustrated and described, variations and modifications will be apparent to those skilled in the art. Therefore, I do not wish to be limited thereto and ask that the scope and breadth of this invention be determined from the claims that follow rather than the above description.

What I claim as a new and useful contribution to the art and for which I desire Letters Patent is:

1. An environmental temperature control system regulator, comprising:
    a clock means for producing a continuous series of electrical pulses;
    a counter means responsive to said clock for producing a plurality of timing pulses in response to a predetermined number of said series pulses;
    temperature responsive means for producing a digital signal;
    a comparator means for comparing an output of said temperature responsive means with an output of said counter means for producing a control signal; and means responsive to said control signal for controlling the temperature modifying means of an environmental temperature control system.

2. An environmental temperature control system regulator as defined in claim 1 wherein said comparator means comprises digital comparator means responsive to said counter means and said means for producing a digital signal.

3. An environmental temperature control system regulator as defined in claim 2 wherein said means for producing a digital signal comprises:
    an electronic temperature sensor; and
    an analog-to-digital converter.

4. An environmental temperature control system regulator as defined in claim 3 wherein said means responsive to said control signal comprises:
    a logic means responsive to said control signal for producing a first gating pulse for the duration of said control signal and a second gating pulse for the duration of the absence of said control signal;
    an electrically responsive load controlling switch; and switch means for mutually exclusively coupling said first and said second gating pulses to said electrically responsive switch for controlling the state thereof.

5. An environmental temperature control system regulator as defined in claim 4 wherein said load controlling switch is a solid state switching means.

6. An environmental temperature control system regulator as defined in claim 5 wherein said load is a light emitting diode adapted to actuate a light responsive switch means for controlling said environmental control system temperature modifying means further including:
a zener diode in series with said light emitting diode and said solid state switching means.

7. An environmental temperature control system regulator as defined in claim 6 wherein said environmental control system temperature modifying means is a fuel combustion means.

8. An environmental temperature control system regulator as defined in claim 6 wherein said environmental control system temperature modifying means includes mutually exclusively operable fuel combustion means and air conditioning system cooling means.

9. An environmental temperature control system regulator as defined in claim 1, wherein said temperature responsive means comprises:
an electrical temperature sensor adapted to produce an analog voltage;
potentiometer means for controllably attenuating the output of said temperature sensor;
analog-to-digital converter means for converting said attenuated output of said temperature sensor into a plurality of digital signals; and said comparator means comprises:
8-bit register means responsive to said analog-to-digital converter;
4-bit register means responsive to said analog-to-digital converter;
8-bit latch means responsive to said analog-to-digital converter;
adder means responsive to said counter means, said 4-bit register, and said 8-bit register; and a comparator responsive to said adder means and said 8-bit latch for providing said control signal.

10. An environmental temperature control system regulator, comprising:
a clock means for producing a continuous series of electrical pulses;
a counter means responsive to said clock for producing a plurality of timing pulses in response to a predetermined number of said series pulses;
an electronic temperature sensor;
an analog-to-digital converter responsive to said electronic temperature sensor;
digital comparator means responsive to said counter means and said digital-to-analog converter for producing a control signal;
a logic means responsive to said control signal for producing a first gating pulse for the duration of said control signal and a second gating pulse for the duration of the absence of said control signal; a solid state load controlling switching means; switch means for mutually exclusively coupling said first and said second gating pulses to said solid state load controlling switching means for controlling the state thereof;
a light emitting diode responsive to said solid state load controlling switching means;
a light responsive switch means responsive to said light emitting diode; and
a zener diode in series with said light emitting diode and said solid state load controlling switching means.

11. An environmental temperature control system regulator as defined in claim 10 wherein said environmental control system temperature modifying means is a fuel combustion means.

12. An environmental temperature control system regulator as defined in claim 10 wherein said environmental control system temperature modifying means includes mutually exclusively operable fuel combustion means and air conditioning system cooling means.

13. An environmental temperature control system regulator, comprising:
a clock means for producing a continuous series of electrical pulses;
a counter means responsive to said clock for producing a plurality of timing pulses in response to a predetermined number of said series pulses;
an electrical temperature sensor adapted to produce an analog voltage;
potentiometer means for controllably attenuating the output of said temperature sensor;
analog-to-digital converter means for converting said attenuated output of said temperature sensor into a plurality of digital signals;
8-bit register means responsive to said analog-to-digital converter;
4-bit register means responsive to said analog-to-digital converter;
8-bit latch means responsive to said analog-to-digital converter;
adder means responsive to said counter means, said 4-bit register, and said 8-bit register;
a comparator responsive to said added means and said 8-bit latch for providing said control signal for producing a control signal; and
means responsive to said control signal for controlling the temperature modifying means of an environmental temperature control system.

* * * * *